(12) United States Patent
Liebich et al.

(10) Patent No.: US 6,203,024 B1
(45) Date of Patent: Mar. 20, 2001

(54) BELLOWS

(75) Inventors: Charl Liebich; Helmut Ganswindt, both of Dannenberg (DE)

(73) Assignee: ContiTech Formteile GmbH (DE)

( * ) Notice: Subject to any disclaimer, the term of this patent is extended or adjusted under 35 U.S.C. 154(b) by 0 days.

(21) Appl. No.: 09/036,444

(22) Filed: Mar. 5, 1998

(30) Foreign Application Priority Data

Mar. 5, 1997 (DE) ................................. 197 08 932

(51) Int. Cl.⁷ ........................................ F16J 15/32
(52) U.S. Cl. ........................ 277/634; 277/559; 277/635
(58) Field of Search .................... 277/636, 635, 277/634, 559, 560, 637

(56) References Cited

U.S. PATENT DOCUMENTS

| | | | |
|---|---|---|---|
| 3,620,540 | * 11/1971 | Jagger | 277/559 |
| 3,640,542 | * 2/1972 | Mowat et al. | 277/134 |
| 3,913,925 | * 10/1975 | Gyory | 277/559 |
| 4,118,856 | * 10/1978 | Bainard et al. | 277/559 |
| 4,224,808 | 9/1980 | Gerrke . | |
| 4,852,891 | 8/1989 | Sugiura et al. . | |
| 4,878,389 | * 11/1989 | Boge | 277/636 |
| 5,195,757 | * 3/1993 | Dahll | 277/559 |
| 5,915,696 | * 6/1999 | Onuma et al. | 277/559 |

FOREIGN PATENT DOCUMENTS

| | | |
|---|---|---|
| 3309386 | 10/1984 | (DE) . |
| 8335598 | 5/1985 | (DE) . |
| 2 296 946 | 7/1996 | (GB) . |

* cited by examiner

Primary Examiner—Anthony Knight
Assistant Examiner—Mark Williams
(74) Attorney, Agent, or Firm—Robert W. Becker & Associates

(57) ABSTRACT

A bellows for encasing the connecting region of a tie bar of a motor vehicle is provided. The inner surface of the mounting collar is provided with projections that extend at an oblique angle to the axis of the mounting collar. Free spaces that remain next to and between the projections can be filled with a lubricant.

12 Claims, 2 Drawing Sheets

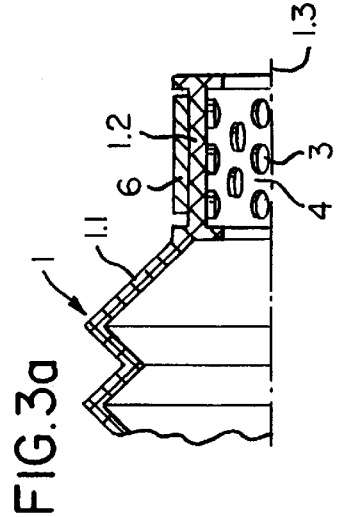
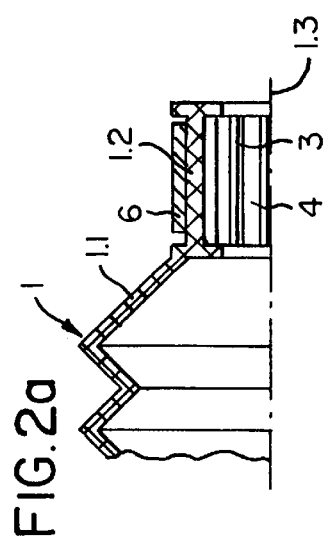
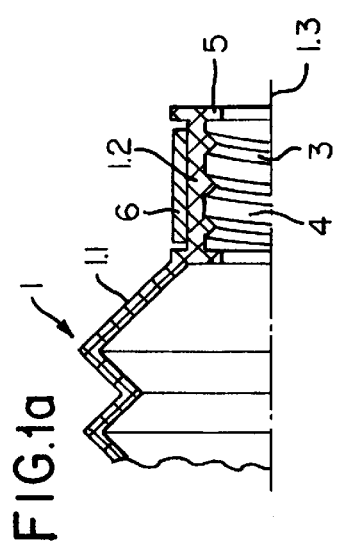
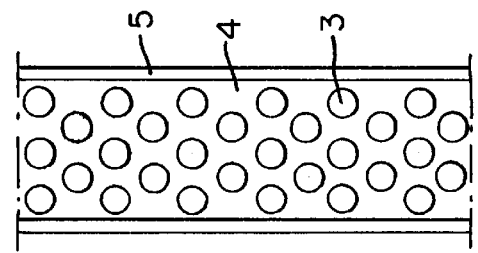
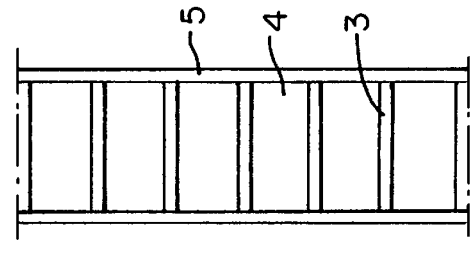
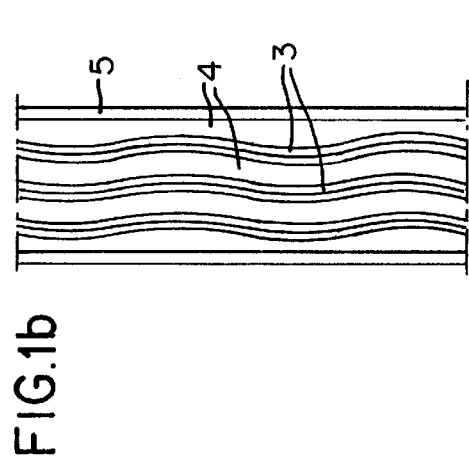
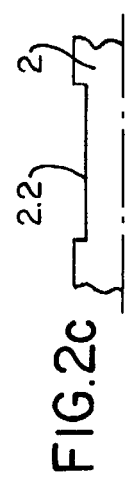
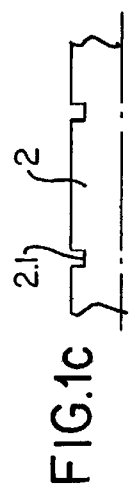

BELLOWS

BACKGROUND OF THE INVENTION

The present invention relates to a bellows, especially for encasing the connecting region of a tie bar of a motor vehicle.

Such a bellows is known from DE-GM 83 35 598. Unfortunately, this known bellows, as well as other known embodiments especially where used for tie rods of motor vehicles, have a critical drawback for the mounting and adjustment of the tie bars. In particular, by tightening the fixing clamp or band that surrounds the mounting collar of the bellows, the mounting collar is fixed to the tie bar as a result of the thereby generated static friction in such a way that subsequently it is no longer readily possible to turn the tie bar relative to the bellows. If the tie bar is set or adjusted at a later stage, it is first necessary to each time loosen the fixing band.

It is therefore an object of the present invention to reduce the time that has to be expended in such an operation, and to avoid the inaccuracies that occur in doing so during the adjustment of the tie bar, as well as to prevent axial deformation of the bellows and defects caused thereby.

BRIEF DESCRIPTION OF THE DRAWINGS

This object, and other objects and advantages of the present invention, will appear more clearly from the following specification in conjunction with accompanying schematic drawings, in which:

FIG. 1a is an axial longitudinal cross-sectional view through the collar end of one exemplary embodiment of the inventive bellows, the mounting collar of which has on its inner surface projections in the form of raised strips that are curved in an undulating manner;

FIG. 1b shows the inner surface of the mounting collar of the bellows of FIG. 1a;

FIG. 1c is an axial cross-sectional view through the corresponding portion of the pertaining tie bar;

FIGS. 2a, 2b and 2c are views similar to those of FIGS. 1a, 1b and 1c of another exemplary embodiment of the inventive bellows, with the projection of the inner surface of the collar being embodied as axially parallel strips;

FIGS. 3a, 3b and 3c are views similar to those of FIGS. 1a, 1b and 1c of a further ememplary embodiment of the inventive bellows, with the projections on the inner surface of the collar being embodied as uniformly disposed, circular knobs;

SUMMARY OF THE INVENTION

Figure 6:
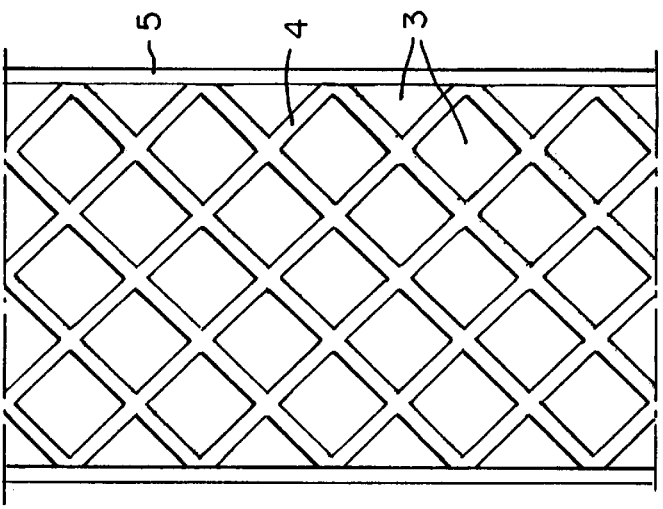
FIGS. 4, 5 and 6 are enlarged views of the inner surface of the collar of further advantageous exemplary embodiments of the inventive bellows showing various configurations for the projections.

The bellows of the present invention, which is provided especially for encasing the connecting region of a tie bar of a motor vehicle, and which can be made of a thermoplastic elastomer, comprises a folded body which is provided on an axial end thereof with a mounting collar that by means of a fixing strap is adapted to be fixed on the bar; an inner surface of the mounting collar is provided with radially inwardly directed projections that in a designated or designed installed state of the bellows are subjected to the radial contact pressure of the fixing strap; boundary lines that circumscribe the projections, at least along a part of their path, form an angle of other than 90° with a longitudinal axis of the mounting collar; and free spaces remain next to and between the projections on the inner surface of the mounting collar for receiving lubricant.

Conventional bellows are always constructed in such a way that their mounting collar, by means of tensible fixing bands, can be fixed in a possibly absolutely nonrotatable manner on the axial beams, connectors, or the like that they surround. Otherwise, for example the so-called axial sleeves, which are used to encase the homokinetic joints of front wheel drives of motor vehicles, would be exposed to constant torsional stresses that would lead to excessive wear and premature defects.

In contrast to the known concepts, the present invention proceeds from the idea that for a bellows that is suitable for encasing the connecting region of a tie bar of a motor vehicle, it would be advantageous if the tie bar could at any time be easily rotated, even when the mounting band or strap is securely tightened, so that the tie bar can be set or readjusted without having to loosen the fixing strap. The present invention realizes this new idea by providing on the inner surface of the mounting collar of the bellows spaces that can be filled with a lubricant, and by embodying the boundary or limitation of these grease pockets in such a way that with the slightest rotation of the mounting collar relative to the tie bar the lubricant is necessarily pushed in a wedge-shaped manner under the contact surfaces via which the mounting collar rests against the tie bar under the pressure of the fixing strap.

In practice, this is achieved pursuant to the present invention by providing on the inner surface of the mounting collar projections that at least along a portion of their path, and preferably predominantly, extend at an oblique angle to the axis of the collar and not, as for example disclosed in DE-GM 83 35 598, as wide encircling ribs that extend in the circumferential direction. Since the spaces that are adjacent to the projections are filled with a lubricant in the designated installed state of the inventive bellows, the oblique-angled path of the projections causes the radial end faces of the projections, during the slightest rotation of the mounting collar relative to the tie bar, to immediately come into contact with surface portions of the tie rod that are covered with lubricant, with the result that the mounting collar can be rotated further with little expenditure of energy.

This manner of operation can be optimized for respective applications via various inventive configurations that will be discussed subsequently.

In particular, it is expedient to provide a respective sealing lip at each axial end of the mounting collar for axially sealing off the grease pockets and for in addition serving for the exact axial positioning of the mounting collar on the tie bar. The indicated inventive projections that are formed on the inner surface of the mounting collar preferably have no sharp edges at the transition from their free radial end faces to their side surfaces, but rather are at that location rounded off or beveled, so that when the mounting collar is rotated, the projections can easily slide on the lubricant.

Further specific features of the present invention will be described in detail subsequently.

DESCRIPTION OF PREFERRED EMBODIMENTS

Referring now to the drawings in detail, FIG. 1a shows a partial longitudinal cross-sectional view of a bellows 1, which includes the folded body 1.1 and the mounting collar 1.2 which, by means of a fixing band or strap 6, can be fixed on a tie bar 2, which is illustrated in a longitudinal section in FIG. 1c. In order to ensure an exact axial positioning between the bellows 1 and the tie bar 2, the tie bar is provided with grooves 2.1 into which engage circumferential sealing lips 5 that are correspondingly formed on the axial ends of the mounting collar 1.2; in this way, the sealing lips 5 fix the mounting collar in an exactly defined position.

Formed on the inner surface of the mounting collar 1.2 are projections in the form of raised strips or ridges 3 having a triangular cross-sectional shape; the projections 3 extend circumferentially in an undulating or serpentine manner, and thereby over nearly their entire path form with the longitudinal axis 1.3 of the mounting collar 1.2 an angle of other than 90°. The free spaces 4 between the projections 3 are filled with a lubricant; in other words, the projections form so-called grease pockets. As a consequence of the predominantly oblique-angled path of the edges of the projections 3, already the slightest rotation of the mounting collar 1.2 leads to the delivery of lubricant to below the projections and enables the further rotation of the mounting collar 1.2 upon the tie bar 2 with minimal exertion of force. The restraint that thereby occurs at the circumferential and encircling sealing and holding lips 5, which do not have the benefit of this lubrication due to their perpendicular path relative to the longitudinal axis, is negligible since the sealing lips are disposed beyond the compression range of the fixing strap 6.

In the embodiment illustrated in FIGS. 2a, 2b and 2c, the entire mounting collar 1.2 of the bellows is received by a wide, flat, circumferential groove or recess 2.2 in the tie bar 2; the arrangement and width of this recess corresponds with the axial spacing of the sealing and holding lips 5. As can be seen from FIG. 2b, in this case the inventive projections 3 are embodied as axially parallel, equidistant strips.

The third illustrated embodiment of FIGS. 3a, 3b and 3c shows the possibility of providing the inventive projections 3 on the inner surface of the mounting collar 1.2 in the form of individually arranged, circular knobs, with the spaces 4 that are disposed about the projections 3 between the sealing lips 5 being available as a lubricant reservoir.

Figure 5:
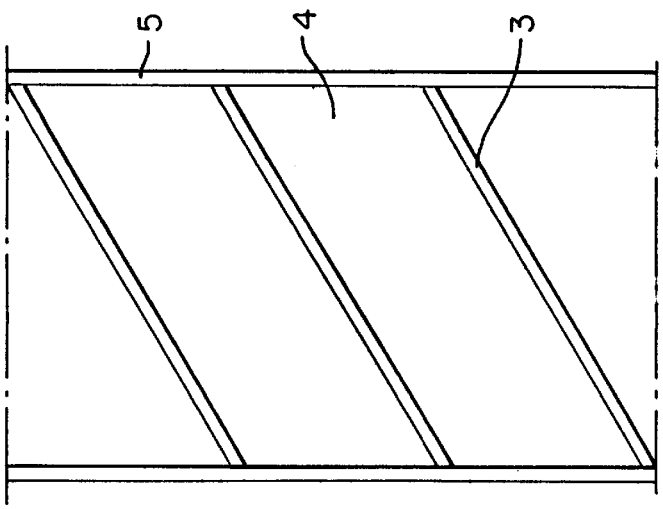
Figure 4:
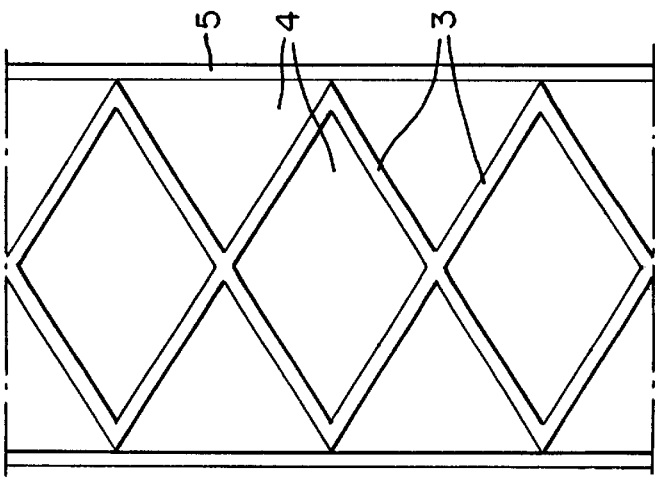

FIGS. 4, 5 and 6 show further possible configurations for the inner surface of the mounting collar of the inventive bellows. In FIG. 4, the projections 3 are formed on the inner surface of the mounting collar as oblique-angled strips, so that between the strips rhombic, diamond-shaped, and triangular grease pockets result. In the embodiment illustrated in FIG. 5, the projections 3 are formed by a number of parallel, strip-like projections that extend at an angle; parallelogram-shaped spaces are available as grease pockets. FIG. 6 shows an embodiment where the projections 3 have a rhombic, diamond and triangular shape, and the recesses that are formed between them and that extend at oblique angles over the width of the mounting collar to the sealing lips 5 form the lubricant reservoir.

Application of the present invention in practice has shown that with the features thereof the stated object can be realized in an impressive manner. In particular, the present invention provides the possibility of introducing completely preassembled steering mechanisms into the fabrication line of motor vehicles, and after their installation into the motor vehicle to carry out the final adjustment of the track or alignment, which as known is only then possible, without for this purpose having to loosen and again tighten the clamp or strap at the mounting collar of the tie bar bellows. This obviously not only saves time, but also considerably simplifies the organizational process.

The specification incorporates by reference the disclosure of German priority document 197 08 932.1 of Mar. 5, 1997.

The present invention is, of course, in no way restricted to the specific disclosure of the specification and drawings, but also encompasses any modifications within the scope of the appended claims.

What we claim:

1. A bellows for encasing the connecting region of a tie bar, comprising:
    a folded body which is provided on an axial end thereof with a mounting collar that by means of a fixing strap is adapted to be fixed on said tie bar, wherein an inner surface of said mounting collar is provided with radially inwardly directed projections that in a designated installed state of said bellows are subjected to a radial contact pressure of said fixing strap, wherein boundary lines that circumscribe said projections, at least along a part of a path of said boundary lines, form an angle of other than 90° with a longitudinal axis of said mounting collar, wherein free spaces remain next to and between said projections on said inner surface of said mounting collar, and wherein said free spaces contain lubricant.

2. A bellows according to claim 1, which is made of a thermoplastic elastomer.

3. A bellows according to claim 1, wherein said boundary lines that circumscribe said projections form an angle of other than 90° with said longitudinal axis of said mounting collar at least along a predominant portion of their path.

4. A bellows according to claim 3, wherein said projections are formed on said inner surface of said mounting collar in the manner of raised strips that extend at an oblique angle, parallel, or in part at an oblique angle and in part parallel to said longitudinal axis of said mounting collar.

5. A bellows according to claim 4, wherein said raised strips intersect one another.

6. A bellows according to claim 4, wherein said strip-like projections are curved.

7. A bellows according to claim 6, wherein said curved projections extend in a serpentine manner.

8. A bellows according to claim 1, wherein said projections are individually disposed in a uniform or non uniform manner on said inner surface of said mounting collar.

9. A bellows according to claim 1, wherein said projections form a diamond-shaped pattern.

10. A bellows according to claim 1, wherein said projections cover less than 50% of said inner surface of said mounting collar.

11. A bellows according to claim 1, wherein said projections are rounded or are beveled.

12. A bellows according to claim 1, wherein axial ends of said inner surface of said mounting collar are provided with radially inwardly and circumferentially extending sealing lips.

* * * * *